United States Patent [19]

Lindsay

[11] Patent Number: 4,930,809
[45] Date of Patent: Jun. 5, 1990

[54] TOWABLE UNIFIED FLOOR FRAME ASSEMBLY

[75] Inventor: Fredrick H. Lindsay, Darwin, Minn.

[73] Assignee: Lindsay Industries, Inc., Seminole, Fla.

[21] Appl. No.: 142,555

[22] Filed: Jan. 11, 1988

[51] Int. Cl.$^5$ .................... B60P 3/32; B62D 21/00
[52] U.S. Cl. .................... 280/789; 296/182; 296/204; 52/693
[58] Field of Search .............. 280/785, 798, 799, 789, 280/781; 52/664, 666, 690, 648, 693; 296/181, 182, 168, 204

[56] References Cited

U.S. PATENT DOCUMENTS

| | | | |
|---|---|---|---|
| 2,851,281 | 9/1958 | Felburn | 280/789 |
| 3,282,603 | 11/1966 | Barth | 280/789 |
| 3,716,267 | 2/1973 | Lindsay | 296/168 |
| 3,738,678 | 6/1973 | King et al. | 296/204 |
| 3,806,147 | 4/1974 | Hanson | 296/168 |
| 4,015,375 | 4/1977 | Lindsay | 296/182 |
| 4,019,299 | 4/1977 | Lindsay | 52/648 |
| 4,106,258 | 8/1978 | Lindsay | 52/693 |
| 4,232,884 | 11/1980 | DeWitt | 280/785 |

Primary Examiner—Richard A. Bertsch
Attorney, Agent, or Firm—Lowe, Price, LeBlanc, Becker & Shur

[57] ABSTRACT

A unified floor frame assembly has two elongate outer load supporting beams formed of elongate beam sections that are butt-spliced to be cambered in parallel vertical planes to counter forces that may tend to cause sagging of the floor frame assembly during transportation. At inner vertical perimeter surfaces of the elongate beams are provided attachment plates for attachment, first, of a wheel carrier assembly detachably mountable thereto with a plurality of wheels partially recessed within the floor frame assembly and, second, a towing hitch assembly attachable to a forward end of the floor frame assembly for applying a towing force thereat. A moisture, dirt, insect and pest excluding thin covering is provided underneath the floor frame assembly and sections of heating and ventilating ducting, piping, wiring and the like are includable during manufacture of the floor frame assembly. Individual floor frame assemblies may be supported at their permanent location underneath the periphery or, where two such floor frame assemblies are to be coupled to obtain a larger size floor, central elongate beams may be supported by metal posts. Upon delivery of the floor frame assembly to its intended location, the wheel carrier assembly and the towing hitch assembly are both detached and removed therefrom for reuse.

30 Claims, 6 Drawing Sheets

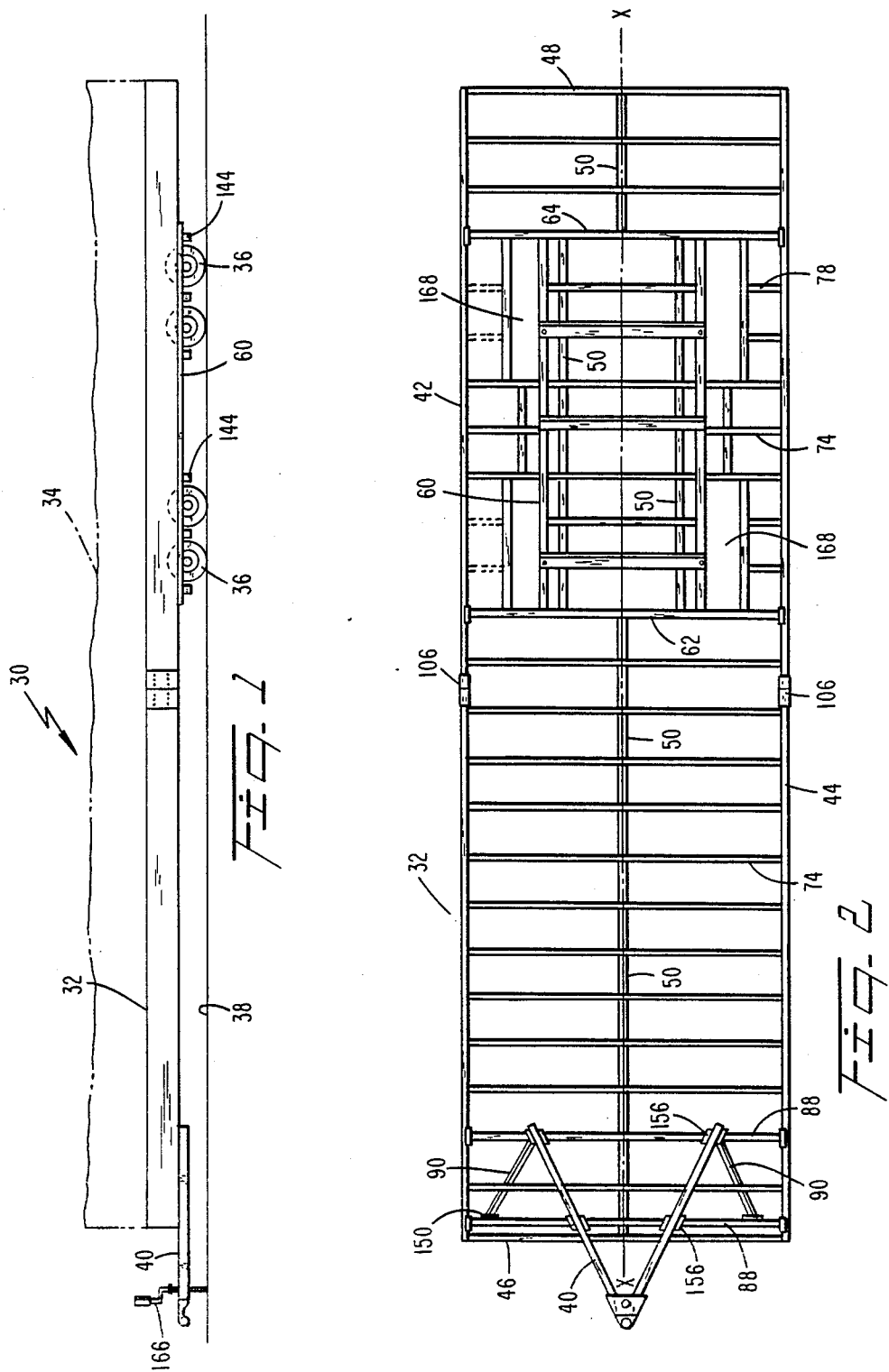

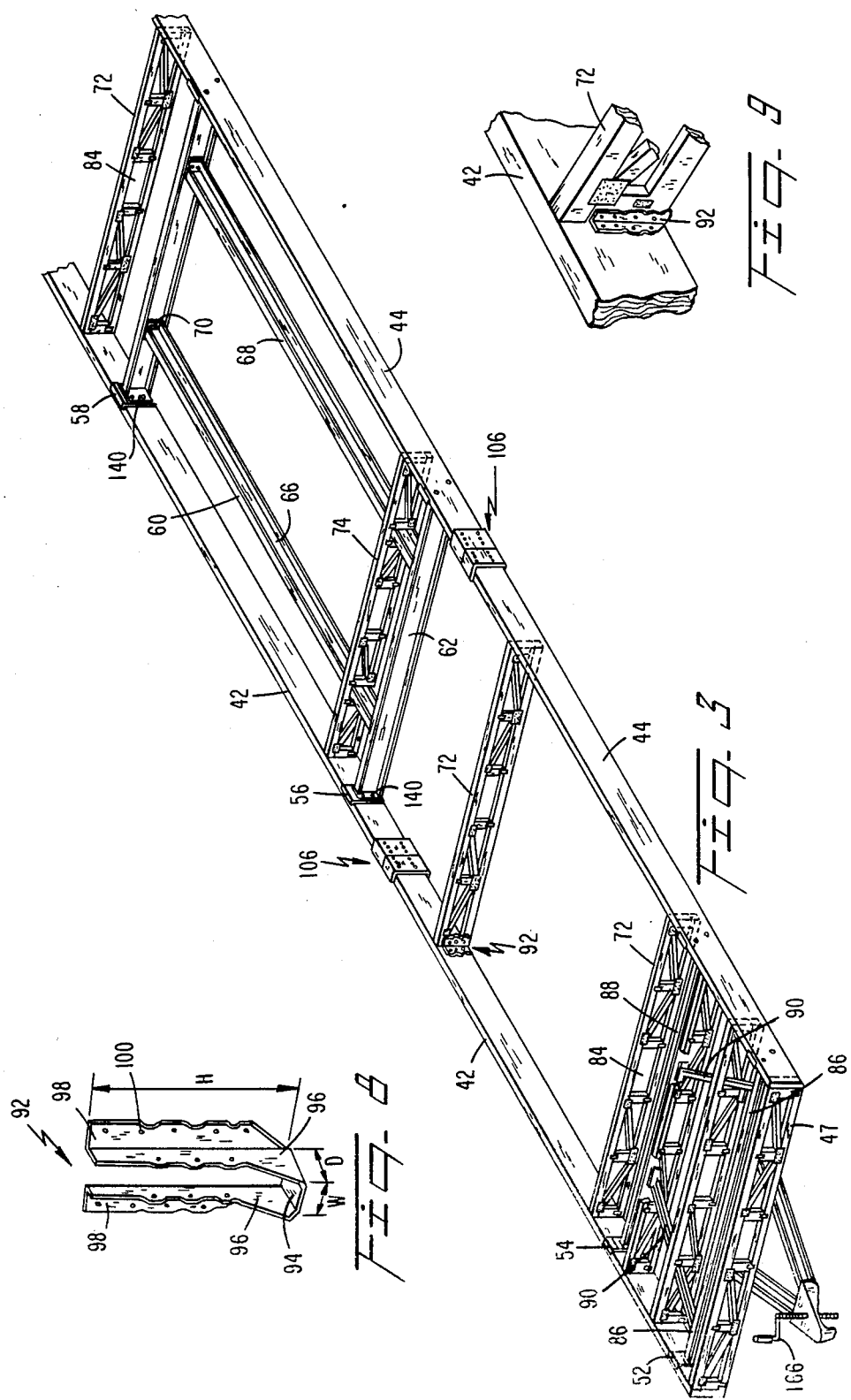

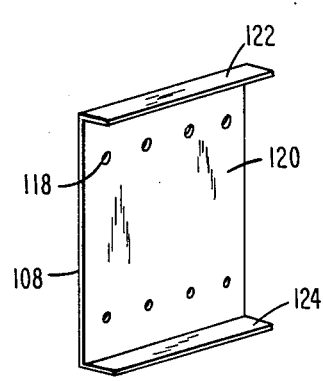 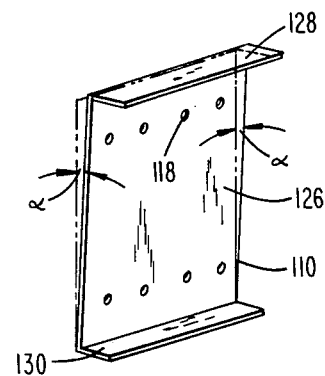
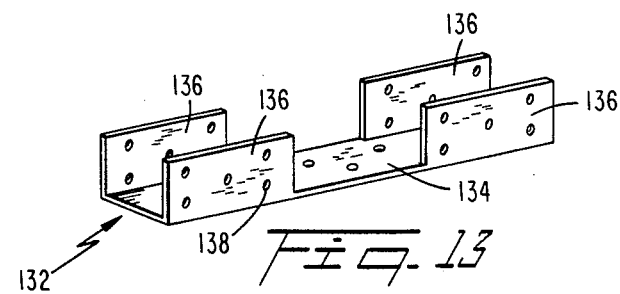
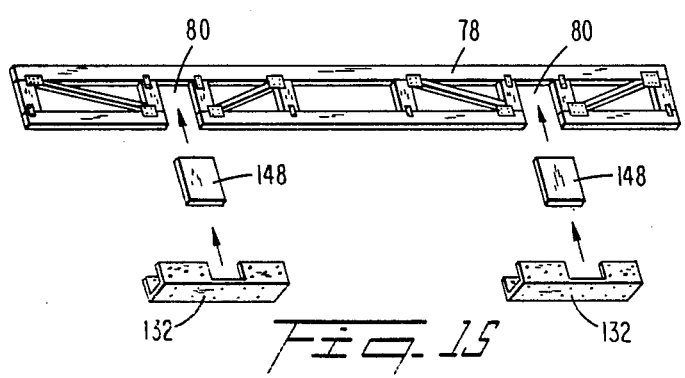

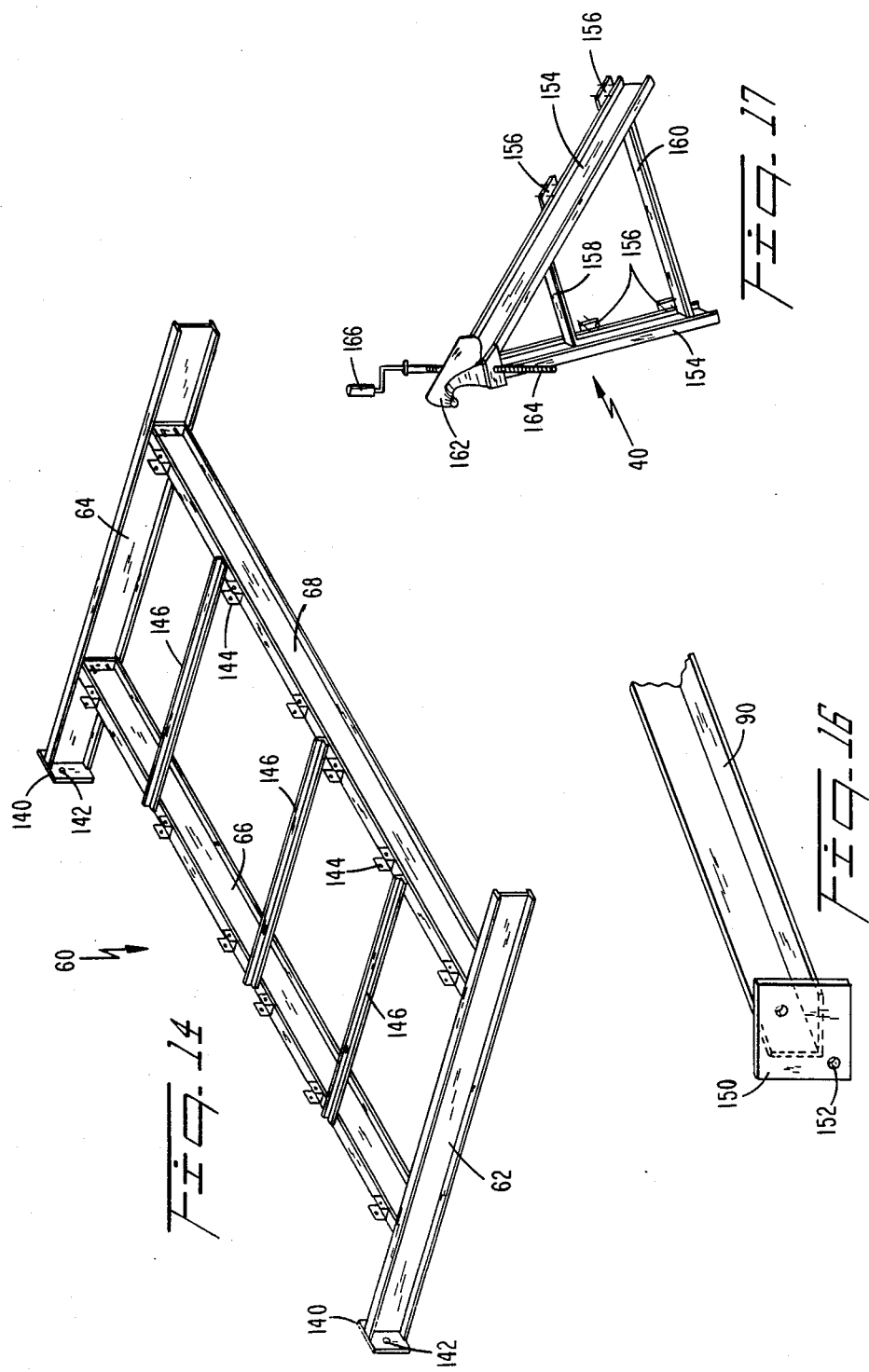

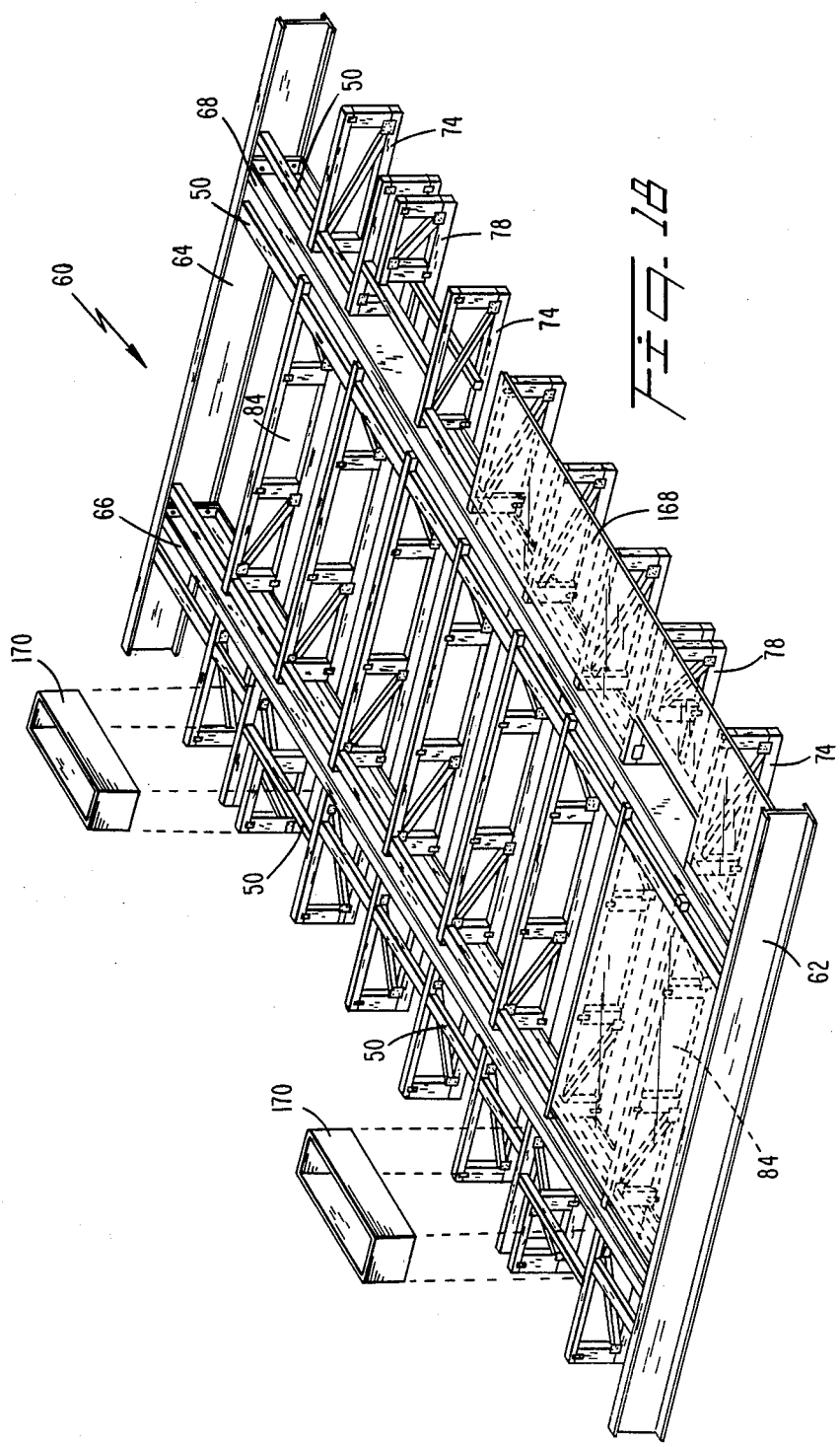

TOWABLE UNIFIED FLOOR FRAME ASSEMBLY

FIELD OF THE INVENTION

This invention relates generally to floor frame assemblies for prefabricated modular housing construction and, more particularly, to a unified floor frame assembly that is readily towable to its permanent location in a stable manner by means of a wheel carriage assembly and towing hitch assembly which are both then readily detached from the floor assembly for reuse.

BACKGROUND OF THE INVENTION

As the population grows and as traditional building methods become increasingly expensive, it has become more desirable for prospective homeowners to use prefabricated modular elements such as floor frame assemblies in building new homes. Such floor frame assemblies, with or without walls, roof, windows and doors and similar superstructure, are normally manufactured at one location and, then, towed along public highways to their ultimate destinations to be mounted on permanent supports in a safe and stable manner.

Every jurisdiction has local housing codes and the like that apply to such structures. Manufacturers thereof, therefore, design the same to satisfy the Uniform Building Code (UBC). In addition to satisfying such requirements, as persons skilled in the art will appreciate, the prefabricated structure must be transported in a safe and stable manner at highway speeds, a fact which requires that the structure being transported be capable of exposure to incidental bouncing and shock loading without significant deleterious effects.

In order to reduce the overall costs to the ultimate purchaser, it is highly desirable to design the structure so that it is transported to its permanent destination in a manner that allows detachment therefrom and retrieval for reuse of the wheel carriage assembly and the towing hitch assembly that were utilized during transportation. Although considerable work has been done in the field of this invention in meeting the needs outlined hereinabove as, for example, exemplified in my own patents, U.S. Pat. Nos. 3,716,267, 4,015,375, 4,106,258 and 4,019,299, all of which are incorporated herein by reference, there still exists a need for an improved towable unified floor frame assembly that satisfies the UBC, is easily and safely transportable to its ultimate destination and from which the wheel carriage assembly and towing hitch elements can then be readily detached and retrieved for reuse.

DISCLOSURE OF THE INVENTION

Accordingly, it is a principal object of this invention to provide a unified floor frame assembly that can be prefabricated, with or without superstructure, and can be thereafter towed in a safe and stable manner to its permanent destination.

It is another object of this invention to provide a unified floor frame assembly that can be prefabricated, with or without superstructure, that fully satisfies the Uniform Building Code and can be towed in a safe and stable manner to its permanent destination.

It is yet another object of this invention to provide a unified floor frame assembly that can be transported in a safe and stable manner on a wheel carriage assembly that recesses substantially into the floor frame assembly, by means of a towing hitch assembly, wherein both the wheel carriage assembly and the towing hitch assembly are readily detachable following delivery of the floor frame assembly to its destination.

It is yet another object of this invention to provide a unified floor frame assembly that is at least ninety-nine percent by weight constituted of wood or wood products, exclusive of detachable wheel carriage and towing hitch assemblies utilized during transportation of the floor assembly to a permanent destination.

It is an even further object of this invention to provide a readily towable unified floor frame assembly that is prefabricated with a sheet-like layer disposed substantially over the lower expanse thereof to exclude from the floor frame assembly moisture, dirt, insects and pests.

It is yet another object of this invention to provide a readily and safely towable unified floor frame assembly that can be prefabricated with or without a superstructure, has a moisture, dirt, insect and pest excluding sheet-like layer extending across its lower expanese and has elements of heating and ventilating ducting, and/or wiring installed within during assembly and manufacture.

Yet another object of this invention is to provide a unified floor frame assembly having a length in excess of sixty feet, suitable for combining with another similar floor frame assembly, that can be transported after prefabrication, with or without a superstructure, in which principal elongate lengthwise disposed load supporting beams are formed with a camber in the vertical plane to counter and compensate for incidental loads experienced by the assembly during its transportation from the point of manufacture to its permanent destination.

These and other objects of the present invention are realized by providing a modular, readily towable unified floor frame assembly that includes two elongate outer load supporting beams disposed parallel to a longitudinal axis of the assembly, front and rear end members respectively connected perpendicular to the axis at respective front and rear ends of the outer load supporting beams to define a perimeter of the assembly, and carrier means comprising a carrier frame and axles for supporting a plurality of load bearing wheels shaped and sized to fit within the assembly perimeter. A plurality of first trusses are disposed and connected normal to the elongate beams in a manner that defines a region that is free of such first trusses and within which the detachable wheel carrier means can be received and securely attached to the floor frame assembly. Within the wheel carrier receiving region, second trusses are disposed normal to the axis, these second trusses each being formed with a plurality of vertical first gaps disposed symmetrically about the axis and of a width sufficient to accommodate portions of the wheel carrier frame therewithin. Within the same carrier receiving region, a plurality of third trusses is interspersed with the second trusses and connected parallel thereto to the outer load supporting beams, the third trusses each being provided with a plurality of vertical second gaps disposed symmetrically about the axis and each of a width sufficient to accommodate load bearing wheels of the detachable carrier means so that such wheels are partially contained within the second gaps and the floor frame assembly when the wheel carrier is attached to and supports the floor assembly on the wheels. A substantially flat floor is mounted atop and to the load bearing elongate beams, the front and rear end members, and the first, second and third trusses, and towing hitch means securely attachable to but readily detachable from the floor assembly is provided for applying a towing force at a front end thereof during transportation.

Still other objects and advantages of the present invention will become readily apparent to those skilled in this art from the following detailed description, wherein only the preferred embodiments of the invention are shown and described, simply by way of illustration of the best modes contemplated of carrying out the invention. As will be realized, the invention is capable of other and different embodiments, and its several details are capable of modifications in various obvious respects, all without departing from the invention. Accordingly, the drawing and description hereof are to be regarded only as illustrative in nature and not as restrictive.

BRIEF DESCRIPTION OF THE DRAWINGS

FIG. 1 is a schematic side elevation view of the unified floor frame assembly according to a preferred embodiment, supported on a plurality of wheels and a forwardly attached towing hitch means.

FIG. 2 is a plan view of the underside of the unified floor frame assembly of FIG. 1 with the interior structure exposed.

FIG. 3 is a partial perspective view of the unified floor frame assembly of FIG. 1 at an intermediate stage in its assembly during manufacture.

FIG. 8 is a perspective view of an exemplary joist support bracket for mounting a truss to a load bearing elongate beam FIG. 9 is a partial perspective view illustrating a connection between a truss and a load bearing elongate beam.

FIGS. 11 and 12 illustrate exemplary elements of the metal beam splice utilized for connecting two pieces of elongate load supporting beams with a predetermined camber built therein.

FIG. 13 is a perspective view of a truss splicing coupler utilized with the second and third trusses after removal of the wheel carrier from the floor frame assembly.

FIG. 14 is a partial perspective view of the lower side of the frame portion of the wheel carrier assembly.

FIG. 15 is an exploded perspective view illustrating the manner in which spacer blocks are fitted into corresponding vertical gaps in the second and third trusses according to FIGS. 5 and 6.

FIG. 16 is a partial perspective view of an end portion of a bracing element related to the towing hitch attachment at a forward end of the floor frame assembly.

FIG. 17 is a perspective view looking upward at the towing hitch element attachable to the underneath forward portion of the floor frame assembly for towing thereof.

FIG. 18 is a perspective partial assembly view illustrating the juxtaposition of various lateral trusses, underneath floor covering and wheel-well casings in conjunction with the wheel carrier frame according to a preferred embodiment of the invention.

DESCRIPTION OF THE PREFERRED EMBODIMENTS

Figure 4:
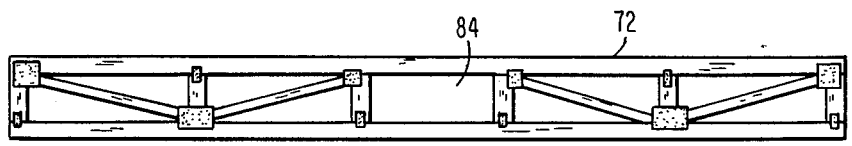
FIG. 4 is an elevation view of a first truss in the preferred embodiment of the floor frame assembly.

As best understood with reference to FIGS. 1 and 2, a typical prefabricated modular construction 30 has a readily towable unified floor frame assembly 32 on which is typically mounted a superstructure 34 comprising walls, a roof and assorted doors and windows (not illustrated). The entire structure is typically supported, during transportation from the point of assembly and manufacture to its ultimate destination, on a plurality of load contacting wheels 36 that ride over a typical road surface 38 when pulled by the application of a forwardly directed towing force on a towing hitch element 40 attached to a forward end of the structure.

Referring now to FIG. 2, the size and shape of the floor frame assembly is defined by elongate outer load supporting beams 42 and 44, typically made of veneered wood and each preferably disposed symmetrically to be parallel about a reference longitudinal axis X—X, and connected at their respective front and rear ends by transverse end members 46 and 48 normal thereto. A towing hitch assembly 40 is firmly but detachably attached to a lower front end portion of the floor frame assembly, preferably by bolting to I-section steel beam elements 86 and 88 which are themselves connected to elongate beams 42 and 44 and are mutually braced by bracing elements 90 (as described in greater detail hereinafter).

As more fully discussed hereinafter with reference to FIGS. 10–12, elongate load supporting beams 42 and 44 may individually comprise at least two lengthwise segments spliced by beam splicing element 106, typically when the overall length of the floor frame assembly is of the order of sixty feet or longer.

A plurality of trusses, typically made of wood with metal fasteners connecting the various elements thereof, such as 72, 74 and 78, are connected normal to the axis X—X between elongate beams 42 and 44. Trusses 74 and 78 differ from trusses 72, in a manner to be discussed hereinafter with reference to FIGS. 4–7, and are located in a region towards the end of the floor frame assembly for attachment of a wheel carriage assembly 60 during transportation thereof. By design, the cooperation of trusses 74 and 78 with elongate beams 42 and 44 accommodates and supports wheel carriage assembly 60 so that a plurality of wheels 36 are partially recessed within wheel wells 168 as best seen in FIG. 2.

FIG. 3, in partial perspective view, illustrates how wheel carriage assembly 60 has a frame-like structure in which two I-section lengths of steel beam 62 and 64 are disposed normal to the elongate load-supporting beams 42 and 44 and, preferably, bolted onto steel plates typified by 56 and 58 to thereby transfer weight of the assembly from the load supporting beams 42 and 44 through the wheel carriage frame 60 to the wheels 36. I-section girders 62 and 64 are connected in the lengthwise direction by similar girders 66 and 68, preferably by bolts at junctions typified by 70 in FIG. 3. In a typical floor frame assembly according to the invention, the majority of lateral trusses 72, as best seen with reference to FIG. 4, are disposed and connected normal to the load supporting beams 42 and 44. In fact, in a preferred embodiment according to this invention, the front and rear end members 46 and 48 are conveniently provided by lateral trusses 72. A convenient typical gap between such adjacent trusses for most applications is twenty-four inches between truss centers For a stronger structure this may be reduced to sixteen inches between truss centers. Flooring material, typically three-fourths of an inch thick plywood in four-foot widths is, therefore, conveniently attachable atop the trusses.

Figure 5:
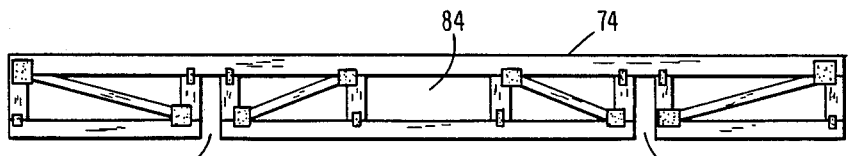
FIG. 5 is an elevation view of a second truss of the type disposed in the wheel carrier region of the floor frame assembly.

A second type of truss 74, best understood with reference to FIG. 5, while similar in overall size to first trusses 72, is formed to have at least a pair of vertically oriented and generally rectangularly shaped gaps 76 which are sized and located to receive therewithin I-section girders 66 and 68 of the wheel carriage assembly frame, as best understood with reference to FIG. 3. With such a disposition of girders, it becomes possible to introduce the frame of the wheel carriage assembly 60 into a recess position within the floor frame assembly perimeter for connection thereto during transportation of the floor frame assembly and for detachment of wheel carriage assembly 60 for extraction subsequent to delivery of the floor frame assembly to its permanent destination.

Figure 6:
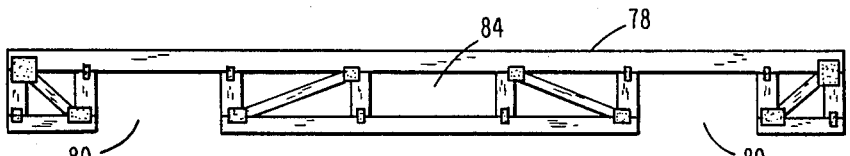
FIG. 6 is an elevation view of a third truss of the type disposed within the wheel carrier region of the floor frame assembly to partially receive load bearing wheels therewithin.

A third type of truss 78, best understood with reference to FIG. 6, is generally similar to truss 74 except that it is provided with two relatively wider substantially rectangular gaps 80 symmetrically disposed about the midpoint of the truss, with gaps 80 laterally wide enough to accommodate therewithin the wheels and tires of the wheel carriage assembly.

Figure 7:
FIG. 7 is a plan view common to the first, second and third trusses, that are respectively illustrated in FIGS. 4, 5 and 6.

In the preferred embodiment, as best understood with reference to FIG. 7, trusses 72, 74 and 78 have uppermost members formed of wooden two-by-fours typically twelve to sixteen feet long and having an upper flat surface 82 to which a plywood floor (not numbered) may be attached in conventional manner.

Referring again to FIG. 3, at a forward end of the floor frame assembly are typical metal plates 52 and 54 connected to inside vertical surfaces of elongate beams 42 and 44 for further connection thereof to I-section transverse beams 86 and 88 crossbraced by connection to bracing beams 90 that are preferably made of L-section channel lengths. Reference to FIG. 16 at this point will clarify the manner in which the L-section channel lengths 90 are welded at their ends to rectangular plates 150 provided with bolt apertures 52 for connection to I-section beams 86 and 88 in a disposition best understood with reference to FIG. 2. Disposing bracing beams 90 at angles in the range 30° to 60° to axis X—X, as will be appreciated by persons skilled in the art, causes the corners of the floor frame assembly to be more rigid and capable of withstanding lateral shock loads as may be encountered during the towing process as the towing vehicle negotiates corners, bumps and associated inertial forces. Particularly when towing hitch 40 is attached to beams 86 and 88 braced by angle beams 90, the entire forward portion of the floor frame assembly is made extremely rigid and strong.

It is most convenient and effective, in terms of insuring lightness with rigidity and strength of the floor frame assembly, to connect trusses 72, 74 and 78 at their respective ends to elongate load supporting beams 42 and 44 by means of known truss hangers 92, best understood with reference to FIG. 8. A typical truss hanger 92 has a floor region 94 "W" wide and "D" deep, with "W" being of a width sufficient to closely accommodate therein the thickness of a single truss 72, 74 or 78 at its end. Truss hanger 92 also has two vertical faces 96 that are parallel and separated by the distance "W". Contiguous with vertical surfaces 96 and normal thereto in the outward directions are similar plane sections 98 that are mutually normal to vertical sections 96 and base section 94. Depending on the size of the truss selected, the vertical sections 96 and 98 would have a height "H" and have formed in vertical sections 96 and 98 a plurality of apertures 100 through which nails or screws may be driven into the truss 72, 74 or 78 (through the apertures in sections 96) and the elongate load supporting beams 42 and 44 (through the apertures in sections 98). This is best understood with reference to FIG. 9 which shows, in perspective, a typical truss 72 supported at a hanger 92 to be connected thereby to elongate load bearing beam 42 at an inner vertical perimeter surface. In this connection, with reference to FIG. 2, the inside vertical surfaces of elongate beams 42 and 44 as well as end members 46 and 48 define inner vertical perimeter surfaces of the floor frame assembly.

Figure 10:
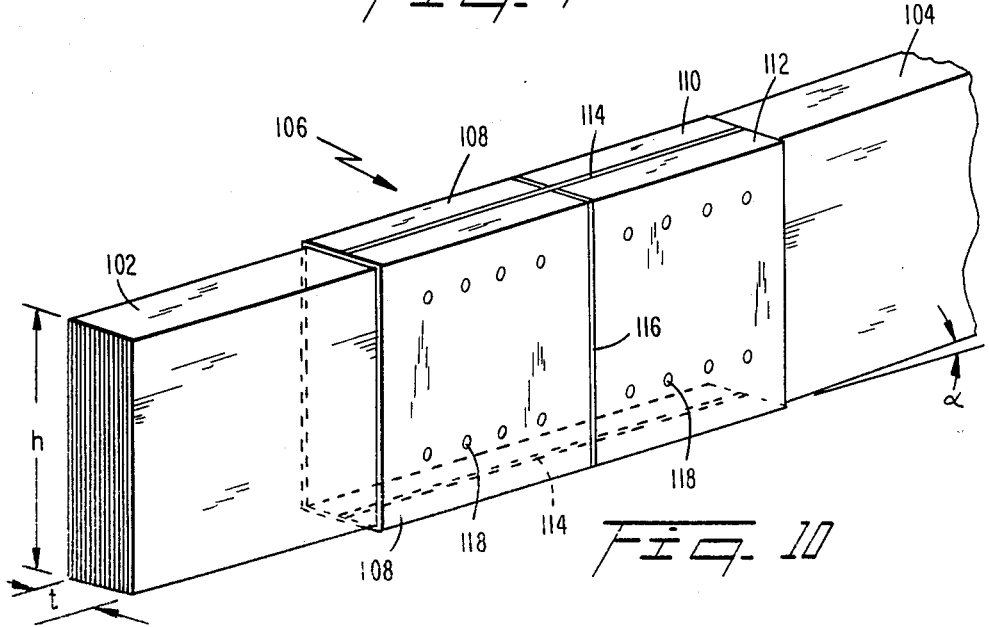
FIG. 10 is a partial perspective view illustrating a metal beam splice in an elongate load supporting beam for generating a controlled lengthwise camber therein.

As previously indicated, when it is desired to have floor frame assemblies of lengths in excess of sixty feet, although elongate beams 42 and 44 can be obtained in veneered wood construction to be of considerable lengths, it may be desirable to connect, by splicing, longitudinally disposed lengths 102 and 104 as indicated in FIG. 10. There are two principal reasons for electing to do this: first, as a practical manner, if the floor frame assembly is to be of a length of, for example, eighty feet, in order to transport the beams from their place of manufacture to their ultimate destination, it becomes necessary to have beam segments of manageable length, e.g., forty feet long; and, second, when very long floor frame assemblies are to be transported, even if a plurality of wheels disposed longitudinally is employed, the sheer inertial loads encountered in normal highway towing would have a tendency to cause the rearward end of the floor frame assembly to sag and distort. A novel and very effective solution to overcome both these problems simultaneously is to form a beam splicing element 106, starting with C-section channel elements 108 (best understood with reference to FIG. 11) and slightly modified versions of the same as represented by C-section channel elements 110 (best understood with reference to FIG. 12), with the total of four such elements, by pairs, closely fitted around the end portions of two elongate beam segments 102 and 104 contacting at their ends for welding of the metal C-sections therearound.

As will be understood with reference to FIG. 11, C-section element 108 comprises three rectangular portions, a portion 120 that is oriented vertically in use and accommodates the vertical cross-sectional dimension "h" of the elongate beam sections 102 and 104 and is formed continuous with two horizontal portions 122 and 124, each of which extends normal to section 108 by a distance not greater than one-half the thickness "t" of elongate beam sections 102 and 104. In contrast to C-sections 108, C-sections 110 have the upright portion 126 in the form of a parallelogram instead of a rectangle, the generally upright sides being parallel and inclined at a small angle "α", with sections 128 and 130 each at right angles to parallelogram-shaped section 126. The transverse extent of sections 128 and 130, like that of sections 122 and 124, is not greater than one-half the thickness "t" of elongate beams elements 102 and 104.

In practice, therefore, the two elongate beam segments 102 and 104 are placed in a jig so as to make contact at adjacent ends, with their sides coplanar. At this point, although it might be preferable to have the end of elongate beam section 104 also trimmed to be at the angle "α" with respect to a line normal to its length, this is not absolutely essential. C-section elements 108 are placed on opposite sides of elongate beam element 102 at its end and sections 110 and 112 (the latter, as persons skilled in the art will appreciate, being a mirror image of section 110) are placed to enclose the end of elongate beam section 104. Welded seams 114 and 116 are then formed in the longitudinal and transverse directions as indicated in FIG. 10 to form, in place, the beam splicing element 106. Note that apertures 118 are provided in all of the C-sections 108, 110 and 112 as indicated in FIG. 10.

Upon formation of beam splicing element 106, as just described, the wood of elongate beam elements 102 and 104 encompassed within splicing element 106 may be drilled to accommodate strong bolts through the entire splicing element and respective elongate beam elements contained therewithin. Appropriate conventional bolts, washers and nuts may then be used to complete the splicing, whereby a very long piece of elongate load supporting beam is created in which portion 104 is cambered at the predetermined small angle "α" with respect to elongate beam element 102 butt-spliced thereto by beam splicing element 106. In practice, it is found convenient and satisfactory to produce a camber of the order of five inches in a length of twenty feet for elongate beam section 104. Depending on the circumstances and the particular sizes of the various elements involved, persons skilled in the art can thus generate very long cambered elongate load supporting beams.

FIG. 13 illustrates a simple truss securing bracket 132, formed preferably of 18-gauge steel sheet metal, that has a long rectangular central portion 134 contiguous near both end portions with lateral rectangular portions 136 on each side extending normally therefrom. A plurality of apertures 138 is provided in all of sections 134 and 136. The use of such a truss securing bracket, after the floor frame assembly is delivered to its intended location and the wheel carriage assembly and towing hitch assemblies are disconnected and removed therefrom, is described in greater detail hereinafter.

FIG. 14 illustrates in partial perspective view wheel carriage assembly frame 60 in which I-section beams 62 and 64 are intended to extend tranversely of axis X—X and are connected by similar I-section lengths 66 and 68 selected to be of a length sufficient to support and accommodate a plurality of wheels as needed. Short rectangular plates 140 are welded to the ends of each of I-beam sections 62, 64, 66 and 68. These rectangular plates 140 are also provided with a plurality of apertures 142 for receiving bolts therethrough. The end plates 140 on I-beam sections 62 and 64 connect, by bolts, to attachment plates 56 and 58 which are also formed of steel and permanently attached to the inside vertical surfaces of elongate beams 42 and 44, as best understood with reference to FIG. 3. Similar attachment plates 52 and 54 are also provided at the inner surfaces of elongate beams 42 and 44 near the forward ends. Although FIG. 3 illustrates only such plates 52, 54, 56 and 58, persons skilled in the art when understanding this description will appreciate that like plates are also provided on the inner vertical surface of elongate beam 44. Similar end plates 140 are welded to the respective ends of longitudinally oriented I-beam sections 66 and 68 and are attachable by bolting to transverse I-beam sections 62 and 64. To further brace the wheel carrier assembly and to provide additional support to conventional spring and wheel axle assemblies (not illustrated since such are commonly known) L-section channel lengths 146 are bolted to the underside (as in use) of longitudinally oriented I-beam sections 66 and 68, as illustrated in FIG. 14.

A plurality of U-section steel axle mounting brackets 144, each having a flat base and two flat vertical sides normal thereto, as best illustrated in FIG. 14, are welded or otherwise connected in known manner at suitable locations of the lowest surfaces of webs of I-section lengths 66 and 68. These are provided with apertures (not numbered) of a size sufficient to accommodate bolts for the attachment thereby of leaf springs or other such known techniques for attaching wheel axles thereto In the embodiment of the wheel carrier frame illustrated in FIG. 14, six such axle mounting brackets 144 are shown attached to each of I-section beams 66 and 68. Such a disposition would readily permit the mounting of six wheels, at three to a side on three axles, each axle being supported by two of brackets 144 on each side. Other variations to support a different number of wheels are apparent. A number of commercially available spring and axle assemblies are available on the market for the purposes under consideration and details thereof are not believed essential to an understanding of the essence of the present invention.

Referring again very briefly to FIG. 3, it is seen how the wheel carrier assembly frame is received within the lower portion of the floor frame assembly for attachment to the inner vertical perimeter surfaces of elongate beams 42 and 44. The entire floor frame assembly would be supported essentially by a plurality of wheels attached to this wheel carrier frame, with a portion of the overall weight of the floor frame assembly being supported during transportation by the towing vehicle attached at the front end of towing hitch assembly 40. Upon transportation of the floor frame assembly to its intended location, whereat adequate supports must be provided around the periphery of each floor frame assembly so that the weight of the same and any superstructure mounted thereon would be conveyed by load supporting beams 42 and 44 to such support elements. Unbolting of the various I-beam sections 62, 64, 66 and 68 thereafter permits ready removal of the wheel carriage assembly frame from the underside of the floor frame assembly 30.

In a very similar manner, the towing hitch assembly 40 is also unbolted and removed from the front end of the floor frame assembly. In most cases, it is found convenient to then mount the towing hitch assembly, to the wheel carrier assembly to simply tow the same on its wheels for reuse in transporting another floor frame assembly.

Upon removal of the wheel frame assembly from the floor frame assembly once the latter is supported at its intended location, it is found desirable to ensure the structural strength of the floor frame assembly by introducing spacing blocks 148 that are shaped and sized to closely fit into, for example, gaps 80 in trusses 78, as best understood with reference to FIG. 15. Persons skilled in the art will immediately appreciate that similar spacer blocks can be shaped and sized to closely fit inside gaps 76 of trusses 74. In either case, suitably sized brackets 132, again as indicated in FIG. 15, may then be used to retain spacer blocks 148 in place and also to ensure tensile strength in the lower reaches of trusses 78 and 74 as appropriate.

The towing hitch assembly 40, as best understood with reference to FIG. 17, includes two I-section lengths 154 that together form a V-shape braced by lateral, preferably L-section, lengths 158 and 160 welded thereto. Flat metal plate sections 156, provided with bolt apertures (not numbered) are conveniently welded to the upper portions of the towing hitch assembly for bolting thereof to support I-beams 86 and 88 that are temporarily attached and recessed into the floor frame assembly at its forward end (as best understood with reference to FIG. 3). At the apex of the V-shape of towing hitch assembly 40 is provided an internally threaded portion receiving a vertically oriented elongate threaded screw jack 164 that can be manually rotated by a crank handle 166 to raise and lower the front end of towing hitch assembly 40 with respect to the ground. At the extreme forward end of the V-shape of towing hitch assembly 40 may be provided a hook-like element 162 to enable coupling, by conventional means, to a typical towing hitch on a towing vehicle. As in the case of the detachable wheel carrier assembly, upon delivery of the floor frame assembly to its intended location, the towing hitch assembly 40 and associated metal elements may be detached and removed from the floor frame assembly 30. Basically, therefore, once the floor frame assembly has been delivered and is mounted at its intended location, practically all the heavy and expensive metal elements that were temporarily attached thereto are readily removed therefrom for use elsewhere.

Referring now to FIG. 18, which shows in partial perspective view more details of how the wheel carrier assembly frame 60 is received into the wheel carrier receiving portion of the floor frame assembly (in FIG. 18 shown in upside down view), it is seen that elongate longitudinally oriented wooden elements 50 are conveniently provided between adjacent trusses at what will be the lowest surfaces thereof during use to brace the trusses with respect to each other and also to provide readily accessible locations at which to attach a thin sheet-like element 168 that extends substantially across the lower expanse of the floor frame assembly 30 to, in effect, generate a box-like structure that excludes moisture, dirt, insects and pests such as rodents. This thin sheet-like material 168 can be thin plywood or, where appropriate, asphalted paper or the like, with or without a net-like reinforcement included therein. Various materials are commonly known for such protective purposes and should be familiar to persons skilled in the art.

To ensure that dirt and moisture do not enter truss regions during transportation in wet weather when splashing of water could force dirt to contact with the nails and rear metallic elements of the floor frame assembly, open box-type generally rectangular wheel-well casings 170, preferably made of material such as fiberglass, are introduced and affixed into the floor frame assembly where the wheels are to be partially recessed therein. Although fiberglass would be a convenient material for this purpose, numerous other materials, e.g., aluminum sheeting, exterior plywood or tempered hardboard may be utilized to form the wheel-well casings 170. These wheel well casings typically will remain within the floor frame assembly but, after removal of the wheel carrier assembly from the floor frame assembly, may be covered with the same material 168 as is used underneath the rest of the floor frame assembly 30.

To summarize, what has been described in a preferred embodiment of the present invention is a modular, readily towable floor frame assembly of extended size, preferably formed with the elongate load supporting beams cambered to counter shock loads during transportation, the same being towable on readily detachable wheel carrier assembly partially recessed into the floor frame assembly, the entire unit being towed with a towing hitch assembly affixed temporarily thereto. Persons skilled in the art will appreciate that recessing of the load supporting wheels into the floor frame assembly will ensure a lower center of gravity during transportation, thus making the entire unit safer and more stable even at highway speeds where transverse winds or other adverse travel conditions may be encountered.

Although certain structural details have been illustrated in FIGS. 4, 5 and 6 for the first, second and third type of trusses discussed in detail hitherto, persons skilled in the art will appreciate that other forms of crossbracing and the like may be utilized with equal effectiveness. A particular advantage of the specific geometries illustrated in FIGS. 4, 5 and 6 for the trusses is that these trusses may each be designed with an opening 84 therethrough of a size and shape such that heating and ventilating duct lengths (omitted from the figures to avoid confusion) may be laid integral therewith during assembly of the floor frame assembly. Likewise, lengths of piping (not illustrated) for carrying water and/or gas may be affixed into the inner reaches of the trusses disposed along the length of the floor frame assembly. Lengths of electrical wiring (not illustrated) may be conveniently stapled underneath the floor and will extend along the floor frame assembly 30.

Persons skilled in the art will also appreciate that assorted types of thermal insulation may be stapled or otherwise affixed integrally with the floor frame assembly 30 as the same is being assembled, e.g., fiberglass affixed to vapor barrier type aluminized sheet can be nailed or stapled between adjacent trusses and between end trusses and the cross members at the ends of the elongate load supporting beams 42 and 44. When such refinements are included in the floor frame assembly, provision of the moisture, dirt, insect and pest excluding sheet-like layer 168 creates a very compact, light, relatively inexpensive, modular and easily towable floor frame assembly that is extremely convenient to use either as a single unit supported underneath its periphery at its permanent location or, where larger sizes are desired, a coupling of two such floor frame assemblies side by side with metal post supports under the peripheries in a central region. Such assemblage of individual modular units is common and can be conveniently practiced by persons skilled in the art in known manner.

Where one or more floor frame assemblies as described herein is utilized as the lowest floor, e.g., a building structure with a basement, attractive ceiling material may be nailed, glued or otherwise affixed to the underside of the floor frame assembly 30 to serve as a conventional ceiling for the basement of the building. Similarly, where one or more such floor frame assemblies is to be utilized as the second floor of a building structure, ceiling material may similarly be utilized to cover up the lowest surface of the floor frame assembly 30. As persons skilled in the art will appreciate, recessed lighting fixtures, air vents and the like can be conveniently mounted in known manner therein. The same is true of fire protection systems involving sprinklers and pipes to deliver fire retardant fluids.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A readily towable unified floor frame assembly, comprising:

two elongate outer load-supporting beams disposed parallel to a longitudinal axis of said floor frame assembly, each of said beams having respective front and rear ends;

front and rear end members respectively connected perpendicular to said axis at said front and rear ends of said outer beams, defining therewith a perimeter of said floor frame assembly, said perimeter having substantially vertical inner and outer perimeter surfaces substantially defined by corresponding inner and outer surfaces of said outer beams and said end members;

carrier means comprising a carrier frame and axle means attached thereto for rotatably supporting a plurality of load-bearing wheels, said carrier means being shaped and sized to fit to said inner perimeter surface;

a plurality of first trusses normal to said outer beams and connected to said inner perimeter surface, said first trusses being disposed at predetermined locations inwardly of said front and rear ends of said outer beams so as to define therebetween a carrier receiving region that is free of said first trusses and within which said detachable wheeled carrier means may be received and securely attached to said floor frame assembly at said inner perimeter surface;

a plurality of second trusses normal to said outer beams and connected to said inner perimeter surface inside said carrier-receiving region, said second trusses each being formed with a plurality of vertical first gaps disposed symmetrically about said axis and each of a width sufficient to accommodate portions of said carrier frame therewithin;

a plurality of third trusses interspersed with said second trusses, normal to said outer beams and connected to said inner perimeter surface inside said carrier-receiving region, said third trusses each being formed with a plurality of vertical second gaps disposed symmetrically about said axis and each of a width sufficient to accommodate said load-bearing wheels of said detachable carrier means, whereby portions of said load-bearing wheels are partially contained within said second gaps and said floor frame assembly when said carrier means is attached to and supports said floor frame assembly on said load-bearing wheels;

a floor mounted atop and to said outer beams, said front and rear end members, said first, second and third trusses; and hitch means securely attachable to and readily detachable from said inner perimeter surface for applying a towing force at said front end of said floor frame assembly.

2. A readily towable unified floor frame assembly according to claim 1, further comprising:

a plurality of means for providing truss bracing and floor support, substantially horizontally disposed between adjacent ones of said first, second and third trusses and said front and rear end members.

3. The readily towable floor frame assembly according to claim 1, further comprising:

first attaching means for attaching said carrier frame to said floor frame assembly, said first attaching means comprising a plurality of flat-sided metal elements permanently affixed primarily to said inner perimeter surface at predetermined locations or- said outer load-supporting beams, said metal elements being formed to be securely attachable to said carrier frame and readily detachable therefrom when separation of said carrier frame from said floor frame assembly is desired.

4. The readily towable floor frame assembly according to claim 1, further comprising:

second attaching means for attaching said hitch means to said floor frame assembly, said second attaching means comprising a plurality of flat-sided metal elements permanently affixed primarily to said inner perimeter surface at predetermined locations on said outer load-supporting beams, said metal elements being formed to be securely attachable to said hitch means and readily detachable therefrom when separation of said hitch means from said floor frame assembly is desired.

5. The readily towable floor frame assembly according to claim 3, further comprising:

second attaching means for attaching said hitch means to said floor frame assembly, said second attaching means comprising a plurality of flat-sided metal elements permanently affixed primarily to said inner perimeter surface at predetermined locations on said outer load-supporting beams, said metal elements being formed to be securely attachable to said hitch means and readily detachable therefrom when separation of said hitch means from said floor frame assembly is desired.

6. The readily towable floor frame assembly according to claim 1, wherein:

said front and rear end elements and said first, second and third trusses each are formed to have an aperture defined normal to said longitudinal axis of said floor frame assembly and aligned to readily receive for permanent placement therein of lengths of elongate elements comprising ventilation and heating ducts, utility piping, electrical wiring and the like while said floor frame assembly is being manufactured.

7. The readily towable floor frame assembly according to claim 5, wherein:

at least ninety-nine percent by weight of the unified floor assembly, exclusive of said carrier means and said hitch means, is constituted of wood.

8. The readily towable floor frame assembly according to claim 1, further comprising:

covering means comprising an expanse of a thin sheet-like moisture resistant material attached to the floor frame assembly on the opposite side from said floor thereof, extending substantially over all of said first, second and third trusses and said perimeter except the space immediately around the wheels while the carrier means is attached to said floor frame assembly to support the same, for excluding dirt, pests, insects and moisture from the volume occupied by the floor frame assembly.

9. The readily towable floor frame assembly according to claim 8, further comprising:
thermal insulation material disposed between an under surface of said floor and said covering means within the inner perimeter surface of said floor frame assembly.

10. The readily towable floor frame assembly according to claim 1, wherein:
said outer beams each comprise a plurality of coplanar elongate segments butt-spliced at their respective adjacent ends by means for splicing said segments by firm attachment thereto.

11. The readily towable floor frame assembly according to claim 10, wherein:
said splicing means comprises weldable metal splicing segments assembled to simultaneously overlap a length of each of said pair of adjacent coplanar beam segments, said splicing segments being welded together to form a separate closely fitting sleeve portion around a respective length of each of the spliced adjacent segments enclosed therein, said sleeve portions and the enclosed beam segments being permanently attached by means for attaching the same.

12. The readily towable floor frame assembly according to claim 11, wherein:
the splicing segments are formed such that the welding thereof causes the beam segments spliced thereby to be spliced at an obtuse angle with respect to each other instead of being colinear in their common plane.

13. The readily towable floor frame assembly according to claim 5, wherein:
said outer beams each comprise a plurality of coplanar elongate segments butt-spliced at their respective adjacent ends by means for splicing said segments by firm attachment thereto, said splicing means comprises weldable metal splicing segments assembled to simultaneously overlap a length of each of said pair of adjacent coplanar beam segments, said splicing segments being welded together to form a separate closely fitting sleeve portion around a respective length of each of the spliced adjacent segments enclosed therein, said sleeve portions and the enclosed beam segments being permanently attached by means for attaching the same, the splicing segments being formed such that the welding thereof cause the beam segments spliced thereby to be spliced at an obtuse angle with respect to each other instead of being colinear in their common plane.

14. The readily towable floor frame assembly according to claim 13, wherein:
covering means comprising an expanse of a thin sheet-like moisture resistant material attached to the floor frame assembly on the opposite side from said floor thereof, extending substantially over all of said first, second and third trusses and said perimeter except the space immediately around the wheels while the carrier means is attached to said floor frame assembly to support the same, for excluding dirt, pests, insects and moisture from the volume occupied by the floor frame assembly.

15. The readily towable floor frame assembly according to claim 14, further comprising:
wheel-well casing means, formed of moisture resistant material in a shape and size to accommodate a portion of at least one of said load-bearing wheels while the same is supporting said floor frame assembly within said carrier-receiving region thereof to facilitate exclusion of dirt and moisture from the volume occupied by the floor frame assembly.

16. A readily towable unified floor frame assembly, comprising:
two elongate outer load-supporting beams disposed parallel to a longitudinal axis of said floor frame assembly, each of said beams having respective front and rear ends;
front and rear end members respectively connected to said front and rear ends of said outer beams, defining therewith an inner perimeter surface defined in part by corresponding inner surfaces of said outer beams;
readily detachable carrier means comprising a carrier frame and axle means attached thereto for rotatably supporting a plurality of load-bearing wheels, said carrier means being shaped and sized to fit to said part of said inner perimeter surface;
a plurality of first members respectively connected transversely between said outer beams at predetermined locations inwardly of said front and rear ends of said outer beams so as to define a carrier receiving region within which said detachable wheeled carrier means may be received and securely attached to said part of said inner perimeter surface;
a plurality of second members, each formed to accommodate a portion of said carrier means therewith; connected to said inner perimeter surface inside said carrier-receiving region; and
towing means securely attachable to and readily detachable from a front end of said floor frame assembly.

17. The readily towable floor frame assembly according to claim 16, further comprising:
means for attaching said carrier frame to said floor frame assembly, said attaching means comprising a plurality of flat-sided metal elements affixed to said part of said inner perimeter surface.

18. The readily towable floor frame assembly according to claim 16, wherein:
at least ninety-nine percent by weight of the unified floor frame assembly, exclusive of said carrier means and said towing means, is constituted of wood.

19. The readily towable floor frame assembly according to claim 16, wherein:
said outer beams each comprise a plurality of coplanar elongate segments butt-spliced at their respective adjacent ends by means for splicing said segments by firm attachment thereto.

20. The readily towable floor frame assembly according to claim 16, further comprising:
means for bracing the front end of said floor frame assembly to accommodate loads experienced during towing of the floor frame assembly, said bracing means being attachable to said towing means.

21. A load-supporting elongate beam suitable for integration into a long frame assembly, comprising:
a plurality of elongate elements, each of a selected material, shape and size;

means for butt-splicing at least one end of one of said elongate elements to a corresponding adjacent end of another of said elongate elements so as to be substantially lengthwise contiguous therewith, at least one of said elongated elements comprising veneered wood construction and two of said elongate elements being butt-spliced at a predetermined camber angle with respect to each other, said camber angle being selected to provide a camber of the order of five inches in a twenty foot length of one of the two butt-spliced elongate elements.

22. A splicing element for butt-splicing two elongate elements to form a long beam capable of supporting loading normal to the respective lengths of said elongate elements, comprising:

a first receiving portion formed to closely fit around an end portion of one of said two elongate elements received therein; and a second receiving portion rigidly attached to said first receiving portion, formed to closely fit around an end portion of the other of said two elongate elements received therein, whereby said two elongate elements are contiguously butt-spliced at their ends corresponding to their respective received end portions.

23. A splicing element according to claim 22, further comprising:

means for securely and permanently affixing said received end portions of said butt-spliced elongate elements to the corresponding ones of said first and second receiving portions of the splicing elements.

24. A splicing element according to claim 23, wherein:

said affixing means comprises a plurality of affixing elements and said splicing element and said received portions of said elongate elements received therein are formed to receive the affixing elements therethrough for affixation thereby.

25. A splicing element according to claim 24, wherein:

said two elongate elements each have a longitudinal axis and a cross-section normal thereto and said first and second portions of said splicing element are formed and connected such that the respective axes of the two elongate elements butt-spliced thereby are cambered with respect to each other at a predetermined camber angle.

26. A splicing element according to claim 25, wherein:

said camber angle is selected such as to provide a camber of the order of five inches in a twenty foot length of one of the two butt-spliced elongate elements.

27. A floor joist having at least one closeable gap formed therein, comprising:

a primary longitudinally disposed elongate member;

two secondary longitudinally disposed elongate members having adjacent ends separated by a predetermined distance to define a closeable gap therebetween and connected to said primary longitudinal member by at least two braced transverse members respectively disposed at said adjacent ends to further define said gap;

a closing block, shaped and sized to closely fill said gap; and means for attaching said closing block to said secondary elongate members so as to fill and securely close said gap thereby.

28. A floor joist having at least one closeable gap formed therein according to claim 27, wherein:

said closing block attaching means comprises a sheet metal element shaped and sized to closely fit to an external surface of each of said secondary elongate members and an end surface of said closing block.

29. A wheel carrier assembly suitable for movably supporting a mobile home floor frame assembly having a longitudinal dimension larger than a transverse dimension while being temporarily attached to be partially recessed therein, comprising:

a pair of transverse load supporting elements shaped and sized to be receivable within a structural perimeter of a floor frame assembly for secure temporary attachment thereto;

a pair of longitudinal load supporting elements disposed parallel to a longitudinal axis of the floor frame assembly detachably attached to the transverse load supporting elements and provided with means for attaching to at least one wheels/axle assembly; and a wheels/axle assembly detachably attached to said longitudinal load supporting elements such that wheels thereof are partially recessed within the floor frame assembly.

30. A wheel carrier assembly suitable for movably supporting a mobile home floor frame assembly while being temporarily attached to be partially recessed therein according to claim 27, wherein:

said floor frame assembly, said transverse elements, said longitudinal elements, and said wheels/axle assembly are severally and correspondingly attached by bolts, nuts and washers for secure assemblage during use and ready disassemblement thereafter for easy detachment and removal thereof from the floor frame assembly.

* * * * *